United States Patent [19]

Conklin et al.

[11] Patent Number: 4,740,909
[45] Date of Patent: Apr. 26, 1988

[54] REAL TIME DATA REDUCTION SYSTEM STANDARD INTERFACE UNIT

[75] Inventors: Donald D. Conklin, Dayton; Ernesto L. Martinez-Montoyo, Trotwood; Edward J. Timko, Beavercreek, all of Ohio

[73] Assignee: The United States of America as represented by the Secretary of the Air Force, Washington, D.C.

[21] Appl. No.: 856,907

[22] Filed: Apr. 28, 1986

[51] Int. Cl.⁴ .................................................. G06F 3/00
[52] U.S. Cl. ...................................... 364/900; 342/195
[58] Field of Search ........................................... 342/195; 364/200 MS File, 900 MS File

[56] References Cited

U.S. PATENT DOCUMENTS

| | | | |
|---|---|---|---|
| 3,764,999 | 10/1973 | Simons et al. | 340/172.5 |
| 3,810,174 | 5/1974 | Heard et al. | 343/5 DP |
| 3,964,064 | 6/1976 | Brandao et al. | 343/5 SC |
| 4,493,028 | 1/1985 | Heath | 364/200 |
| 4,494,190 | 1/1985 | Peters | 364/200 |
| 4,499,539 | 2/1985 | Vosacek | 364/200 |
| 4,506,324 | 3/1985 | Healy | 364/200 |
| 4,513,371 | 4/1985 | Celio | 364/200 |
| 4,516,202 | 5/1985 | Kadowaki | 364/200 |
| 4,538,224 | 8/1985 | Peterson | 364/200 |
| 4,660,143 | 4/1987 | King et al. | 364/200 |

Primary Examiner—Raulfe B. Zache
Attorney, Agent, or Firm—Donald J. Singer; Bernard E. Franz

[57] ABSTRACT

The standard interface unit (SIU) is used with the AF-EWES Threat Radar Simulator which selects the best ECM (electronic countermeasure) techniques to counter threats such as surface-to-air missiles (SAM's) and anti-aircraft artillery (AAA). The SIU comprises three modules: (1) Serial Bidirectional Party Line (SBPL) Monitor (2) Acquisition Subsystem Interface Unit (ASSIU) and (3) Multiplex Terminal Unit (MTU). The SBPL Monitor accepts data in serial format and converts it to a parallel format for storage in one of two buffers. The data in storage is next sent to the ASSIU which also has a double buffer set-up for storage of data on a FIFO basis. The data is then transferred to the MTU for reformatting into MIL-STD-1553B, and shipped out serially.

4 Claims, 3 Drawing Sheets

REAL TIME DATA REDUCTION SYSTEM STANDARD INTERFACE UNIT

RIGHTS OF THE GOVERNMENT

The invention described herein may be manufactured and used by or for the Government of the United States for all governmental purposes without the payment of any royalty.

BACKGROUND OF THE INVENTION

This invention relates to a Real Time Data Reduction System Standard Interface Unit, and more particularly to an interface unit coupled between two buses, one bus being the bus for the computers of an electronic warfare simulation system, and the other bus being a slower standard bus for a real time data reduction system.

Ground-based threats against aircraft include surface-to-air missiles (SAM's) and anti-aircraft artillery (AAA), which have highly sophisticated threat radars featuring a wide variety of electronic counter-countermeasures (ECCM) which the threat uses to counter electronic countermeasures carried by the aircraft. Their existence has reduced the effectiveness of the simpler ECM techniques of the past now requiring their own share of complexity to be effective. Today's ECM (Electronic CounterMeasures) techniques are characterized by digital control, precise interactive timing, and high information rates which cannot be evaluated using the low frequency analog methods of the past.

An Air Force Electronic Warfare Evaluation Simulator (AF-EWES) simulates terminal threat radar sites. Its primary function is to provide a method of evaluating different electronic countermeasures techniques currently available to counter these threats and then assist in selecting the optimum technique. However, it has extremely limited real time data reduction capability, and requires manual manipulation of simulation data to determine ECM effectiveness. The evaluation was usually simply a pass/fail determination, with no indication for example, of how close a miss was.

United States patents of interest include U.S. Pat. No. 3,810,174 to Heard et al, which discloses a digital system for conversion of data rates inherent in various scanning patterns to different rates for display. This system includes a high speed buffer memory and a bulk storage memory. U.S. Pat. No. 3,764,999 to Simons et al discloses a circuit for allowing one microwave oscillator to be time shared between multiple incoming radar pulse trains for electronic countermeasures jamming purposes. U.S. Pat. No. 3,964,064 to Brandao et al discloses a data display system having a multilevel video storage device which includes multiple buffer and storage circuits. Also of interest are U.S. Pat. Nos. 4,493,028 to Heath; 4,538,224 to Peterson; 4,513,371 to Celio; 4,516,202 to Kadowaki; 4,499,539 to Vosacek; 4,506,324 to Healy; and 4,494,190 to Peters, each of which discloses a digital computer circuit which functions as an interface for the transfer of data.

SUMMARY OF THE INVENTION

An objective of the invention is to provide interface apparatus for use with an electronic warfare evaluation simulator and a data reduction system to solve the limited real time data reduction capability of the past and to eliminate the requirement for manual manipulation of simulation data to determine ECM effectiveness.

The invention relates to a Real Time Data Reduction System Standard Interface Unit (SIU) for use with the AF-EWES Threat Radar Simulator which selects the best ECM (electronic countermeasure) techniques to counter threats such as surface-to-air missiles (SAM's) and anti-aircraft artillery (AAA). The SIU comprises three modules: (1) Serial Bidirectional Party Line (SBPL) Monitor (2) Acquisition Subsystem Interface Unit (ASSIU) and (3) Multiplex Terminal Unit (MTU). The SBPL Monitor accepts data in serial format and converts it to a parallel format for storage in one of two buffers. The data in storage is next sent to the ASSIU which also has a double buffer set-up for storage of data on a FIFO basis. The data is then transferred to the MTU for reformatting into MIL-STD-1553B, and shipped out serially.

Features of the invention include:

Three modular designs, each operating in full duplex, with 6 data handling processes occurring simultaneously. This unique data I/O technique allows the SIU to receive data at a rate 4 times faster than it can be transmitted (4 MHz vs. 1 MHz), while also flagging simulator error conditions and reformatting data without any data losses. A unique combination of TTL logic, microprocessor, microsequencer, and programmable array logic (PAL) technologies is used.

Flexibility, allowing it to gather data from 5 different simulators.

Transparency, gathering data without degrading simulator authenticity.

Rather than evaluating an ECM technique solely on a pass/fail basis, the capability of monitoring all real time simulation data exists. Dynamic simulation parameters of interest include threat radar conditions, radar receiver information, and target and missile status. This information base is then integrated with analog measurements taken on the ECM technique under test to provide greater insight on its overall effectiveness.

DETAILED DESCRIPTION

The invention is described in an unpublished manual titled "Real Time Data Reduction System-Standard Interfate Unit-User's Manual-Version 1.0" dated May 6, 1985 (hereinafter referred to as "the manual"), written by Lt Donald D. Conklin, United States Air Force, with a ASSIU design section prepared by Ernesto Martinez, and a MTU design section prepared by Edward Timko, Jr. A copy of the manual is included herewith as a part of this application as filed. The following description is abstracted from the manual, which is available in the file and should be consulted for further details.

RTDRS Overview

Figure 1:
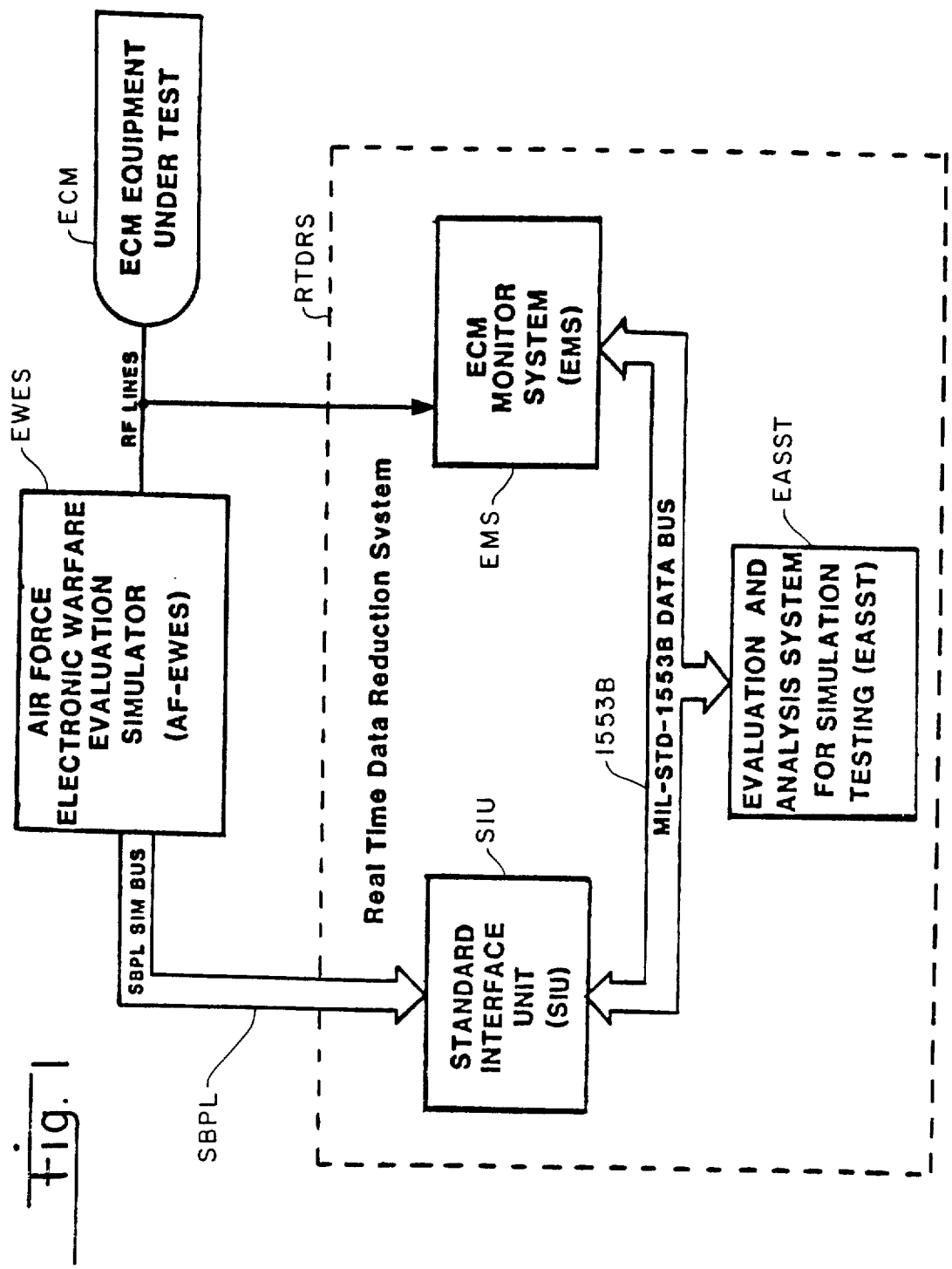
FIG. 1 is a block diagram of a Real Time Data Reduction System (RTDRS)

FIG. 1 is a block diagram of a Real Time Data Reduction System RTDRS for use with the electronic warfare evaluation simulator EWES to test electronic countermeasures equipment ECM. The data reduction system RTDRS comprises the standard interface unit SIU of the invention, along with an ECM monitor system EMS and an evaluation and analysis system for simulation testing EASST, the three units being interconnected via a data bus 1553B. Valuable real time simulation data, both digital and analog, is monitored and collected from the simulator EWES by the interface unit SIU and the monitor system EMS, respectively. This data is then sent across the bus 1553B to System EASST for evaluation and analysis.

Listed below are some of the simulation parameters of interest which the interface unit SIU gathers from the simulator EWES.

| TYPE | |
| --- | --- |
| Radar Conditions | *Electronic Counter-Countermeasures<br>*Scan Rates<br>*Switchology (Manual vs. Auto)<br>*Operator Type-ins |
| Radio Receivers | *Target Pin Words (Power)<br>*Standoff Jamming Pin Words |
| Missile Data | *True Missile Position and Rates<br>*Tracked Missile Position and Rates |
| Target Data | *True Target Position and Rates<br>*Tracked Target Position and Rates |

Introduction to Simulator Serial Bidirectional Party Line Protocol

Figure 2:
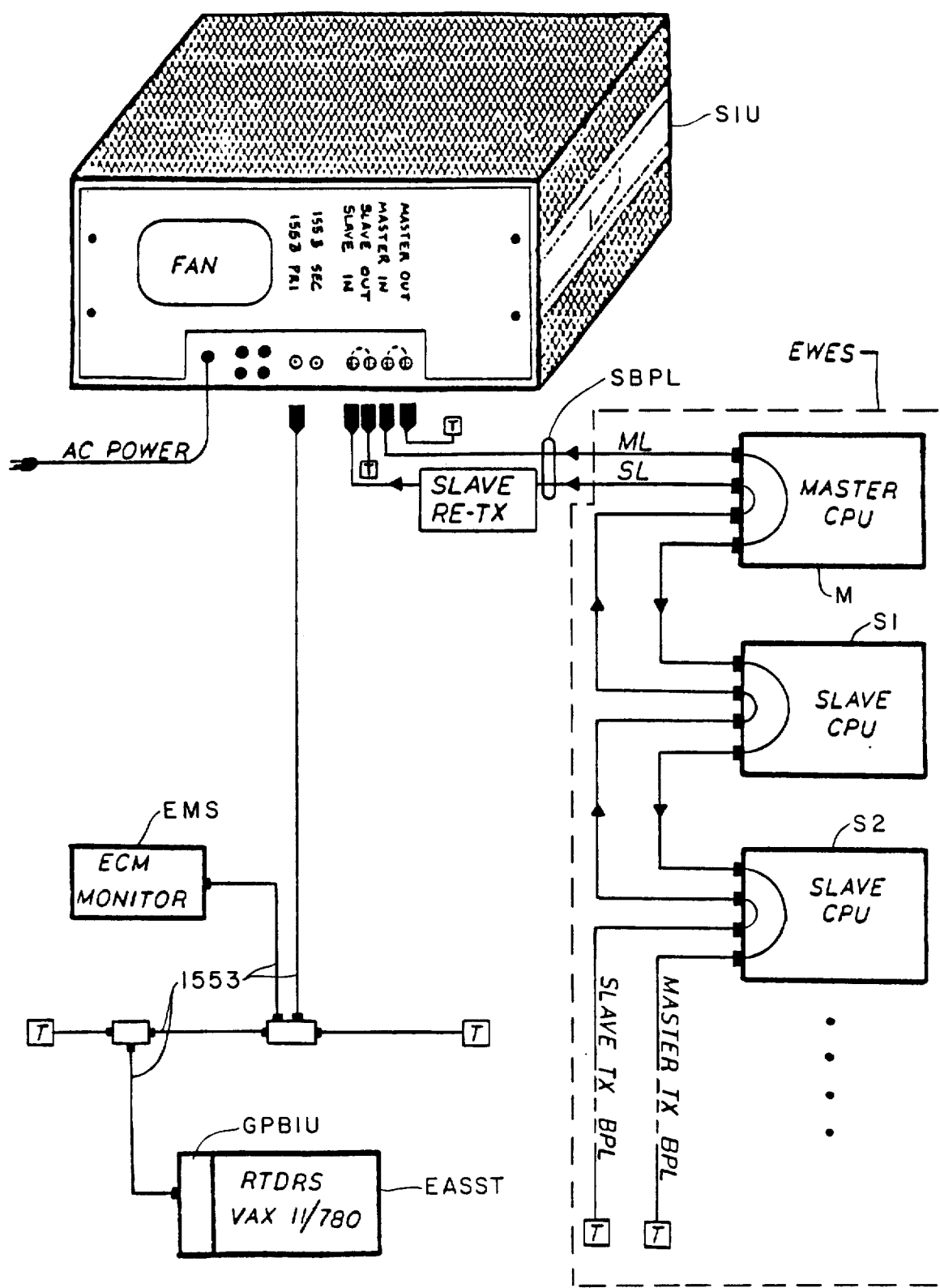
FIG. 2 is another diagram of the Real Time Data Reduction System showing a serial bidirectional party line bus connecting computers of the electronic warfare evaluation simulator, and showing the standard interface unit of the invention in pictorial form from the rear.

FIG. 2 is another diagram of the Real Time Data Reduction System showing a serial bidirectional party line bus SBPL connecting computers of the electronic warfare evaluation simulator EWES, and showing the standard interface unit SIU in pictorial form from the rear. The bus SBPL comprises two separate transmission lines ML and SL on which serial data is transferred between threat radar simulation computers at a 4 MHz NRZ data rate. This high speed is necessary to actuate the rapid changes that occur in the RF environment. The bus SBPL can accommodate one master processor M and as many as 32 slave processors S1, S2, etc. using a daisy chain system configuration. A TWS-4 simulator complex consists of one master CPU and four slave CPU's:

1. Software Programmable Antenna Generator (SPAG)
2. Radar Operator's Console
3. RF Head (G/H Band)
4. Weapons In Command & Control configurations, a fifth slave becomes active, namely the battery commander's display.

As the initiator of all transfers, the master processor M communicates with these slaves and provides them with updates scheduled every 50 or 500 milliseconds, depending on the type of transfer.

The evaluation and evaluation system EASST consists of a Digital Equipment Corporation (DEC) VAX 11/780 mainframe computer for which evaluation and analysis software has been developed. This system has the capability of storing all simulation data gathered by the standard interface unit SIU and the ECM monitor system EMS, as well as displaying information as it is received. The system EASST also includes a general purpose bus interface unit GPBIU, which is the bus controller for the bus 1553B.

Standard Interface Unit Overview

Figure 3:
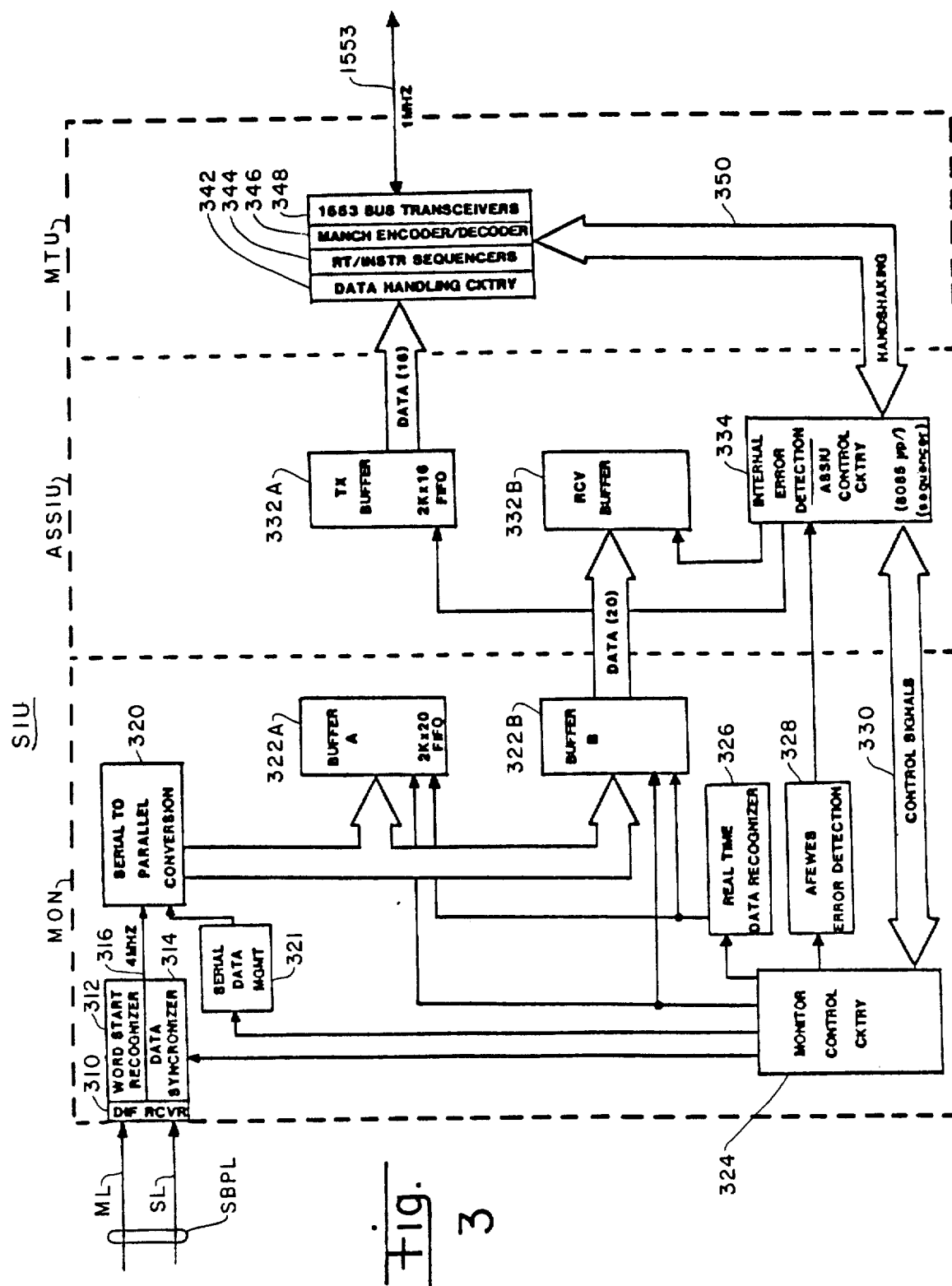
FIG. 3 is a functional block diagram of the Standard Interface Unit.

FIG. 3 is a functional block diagram of the standard interface unit SIU. It comprises three modules on separate boards: a serial bidirectional party line (SBPL) monitor MON, an acquisition subsystem interface unit ASSIU, and a multiplex terminal unit MTU. The monitor MON accepts data in serial format from the bus SBPL and converts it to a parallel format for storage in one of two buffers. The data in storage is next sent to the acquisition subsystem interface unit ASSIU which also has a double buffer set-up for storage of data on a FIFO basis. The data is then transferred to the multiplex terminal unit MTU for reformatting into MIL-STD-1553B, and shipped out serially on the bus 1553B.

The monitor MON interfaces directly to the 4 MHz bus SBPL master terminal line ML and slave transmit line SL twisted pairs. These two lines are the only physical connection between the simulator EWES and the standard interface unit SIU (as shown in FIG. 2). The monitor MON monitors both lines ML and SL in collecting real-time simulation serial data, formatted according to SBPL protocol. The block 310 includes a differential receiver for each of the lines ML & SL, whose outputs are OR'ed and output on a line 316 at the 4-MHz bit rate. This data is synchronized internally, using logic circuits shown as a data synchronizer block 316.

The data on line 316 is supplied to a block 320 for a serial-to-parallel conversion. The 20-bit word formed is then sent to one of two buffers 322A or 322B for temporary storage. In utilizing a double buffering network, one buffer receives data while the other is transmitting data, collected earlier, to the acquisition subsystem unit ASSIU. The standard interface unit SIU performs buffer role-switching based on the recognition of every master-to-SPAG control word appearing on the master transmit line ML. SPAG refers to the Software Programmable Antenna Generator slave computer of the simulator EWES. This particular control word was chosen because the master-to-SPAG data transfer is the only transfer common to all of the simulator EWES simulations from which the standard interface unit SIU will collect data. Using this approach, data received will be grouped into 50 millisecond update blocks (10 ms in Long Track simulation), with each block having the 20-bit master-to-SPAG control word as a header. Any non real-time data transfers appearing on the bus SBPL will be handled similar to real-time transfers except that they will not be stored in memory of the standard interface unit SIU and therefore will not be transmitted via the bus 1553B to the VAX computer of the system EASST.

While the monitor MON is receiving one 50-ms update (in its receiving buffer), the 50-ms update received prior to it (in its transmitting buffer) is sent to the acquisition subsystem interface unit ASSIU. This data is transferred in parallel at a 1-MHz word rate. In addition to sixteen bits of bus SBPL data (excluding the start, acknowledge, control, and stop bits), the monitor MON generates a series of control signals for use by the unit ASSIU. Included is a signal which identifies the beginning of each data transfer appearing within that update (EOT line), and a 1-MHz data strobe which provides a 1-microsecond pulse for each word in the update.

The unit ASSIU also has a double buffer set-up, comprising buffers 332A and 332B. In FIG. 3, the situation is represented in which in the monitor module MON the buffer 322A is receiving while the buffer 322B is transmitting, while in the subsystem module ASSIU the buffer 332A is transmitting while the buffer 332B is receiving. (The data path from buffer 322A to buffer 332A is not shown, and the output from buffer 332B to the module MTU is not shown, since they are disabled during the current transfers.) The module ASSIU "receive" buffer (currently 332B) accepts data words directly from the monitor MON "transmit" buffer (currently 322B), using the control signals mentioned above. The module ASSIU "transmit" buffer (currently 332A) represents the data buffer whose contents are to be transferred to the module MTU. Once again a 1-MHz subsystem strobe (different from the monitor MON/module ASSIU interface data strobe) executes the data transfer, assuming that two module ASSIU/module MTU interface control signal conditions are met: the general enable line (logic 0) and subsystem busy bit (logic 1). If either of these conditions is not met, data flow between the two boards ASSIU & MTU will cease.

Once this data has finally entered the multiplex terminal unit MTU, the final board of the standard interface unit SIU, it is formatted into MIL-STD-1553B format (Manchester Biphase encoded) and shipped out serially at a 1-MHz bit rate across the data bus 1553 at the request of the General Purpose Bus Interface Unit Bus Controller GPBIU (FIG. 2).

The monitor module also includes logic shown as a serial data management block 321, monitor control circuitry block 324, real time data recognizer block 326, and EWES error detection block 328.

The acquisition subsystem interface unit ASSIU, in addition to the buffers 322A & 322B, includes circuits shown as a block 334 with internal error correction circuits, control circuits, and an 8085 microprocessor (sequencer). Control signals are supplied in both directions between the monitor control circuitry 324 and the block 334 via a plurality of conductors shown as line 330. Also handshake signals are sent between block 334 and the module MTU via a multiconductor line 350.

The multiplex terminal unit MTU comprises data handling circuitry 342, receive-transmit/instruction sequencers 344, a manchester encoder/decoder 346, and transceivers 348 coupled to the bus 1553B.

It is understood that certain modifications to the invention as described may be made, as might occur to one with skill in the field of the invention, within the scope of the appended claims. Therefore, all embodiments contemplated hereunder which achieve the objects of the present invention have not been shown in complete detail. Other embodiments may be developed without departing from the scope of the appended claims.

What is claimed is:

1. An interface unit used in a real time data reduction system including a data reduction computer for evaluation and analysis of data from a threat radar simulator which tests electronic countermeasure techniques, said simulator having a master processor and a plurality of slave processors interconnected via a first bus which is a serial bidirectional party line (SBPL) bus, the interface unit being connected to the data reduction computer via a second bus which operates serially at a substantially slower bit rate than the SBPL bus and with a substantially different protocol;

the interface unit comprising: (1) a monitor module coupled to said first bus via transmission line means, (2) an intermediate module used as an acquisition subsystem interface unit (ASSIU) and (3) an output module used as a multiplex terminal unit (MTU);

wherein the monitor module includes input means for receiving data in serial format from the first bus, serial-to-parallel conversion means having a serial input coupled to said input means, two input buffer registers for temporary storage of data in parallel format, and means for alternately coupling parallel outputs of the serial-to-parallel conversion means to inputs of the input buffer registers;

wherein the intermediate module includes two output buffer registers for temporary storage of data in parallel format on a FIFO basis, means for selectively coupling outputs of the input buffer registers to inputs of the output buffer registers, and means for selectively coupling outputs of the output buffer registers to the output module, so that there are alternate configurations comprising a first configuration of the input buffer registers and the output buffer registers and a second configuration of the input buffer registers and the output buffer registers; said first configuration having a first one of the input buffer registers coupled to the outputs of the serial-to-parallel conversion means and a second one of the input buffer registers coupled to a first one of the output buffer registers acting as a receiver buffer, while a second one of the output buffer registers is acting as a transmitting buffer coupled to the output module; and said second configuration having the second one of the input buffer registers coupled to the outputs of the serial-to-parallel conversion means and the first one of the input buffer registers coupled to the second one of the output buffer registers acting as a receiver buffer, while the first one of the output buffer registers is acting as a transmitting buffer coupled to the output module; and wherein the output module comprises means for receiving data from said one of the output buffer registers which is acting as a transmitting buffer, formatting and encoding it, and supplying it serially via the second bus to the data reduction computer.

2. An interface unit according to claim 1, wherein the first bus comprises a master transmit line and a slave transmit line which operates at a 4-MHz serial bit rate, wherein said transmission line means comprises twisted pairs from the master transmit line and the slave transmit line to said input means of the monitor module, there being no other physical connection between said simulator and said interface unit, one of said slave processors being a software programmable antenna generator slave (SPAG) computer;

wherein the monitor module input means includes means to monitor both the master transmit line and the slave transmit line lines in collecting real-time simulation serial data, formatted according to SBPL protocol as 20-bit words, and to synchronize this data internally, wherein means which controls switching between said first configuration and said second configuration is based on recognition of every master-to-SPAG control word appearing on the master transmit line, whereby data received is grouped into update blocks of a predetermined time interval, with each block having a 20-bit master-to-SPAG control word as a header, means for causing any non real-time data transfers appearing on the first bus to be handled similar to real-time transfers except that they will not be stored in the input buffer registers, and therefore will not be transmitted via the second bus to the data reduction computer;

wherein each update block is transferred in parallel from an input buffer register to an output buffer register at a 1-MHz word rate, wherein in addition to sixteen bits of first-bus data (excluding the start, acknowledge, control, and stop bits), the monitor module includes means to generate a series of control signals for use by the intermediate module, including a signal which identifies a beginning of each data transfer appearing within that update (EOT line), and a 1-MHz data strobe which provides a 1-microsecond pulse for each word in the update;

wherein the intermediate module includes means to supply a second 1-MHz subsystem data strobe (different from the monitor module/ASSIU interface data strobe) to execute the data transfer from the transmitting one of the output buffer registers.

3. An interface unit according to claim 2, wherein the monitor module also includes:
   serial data management logic connected to the serial-to-parallel conversion means;
   monitor control circuitry connected to said input means, to the serial data management logic, and to said two input buffer registers;
   real time data recognizer logic connected between the monitor control circuitry and said two input buffer registers; and
   simulator error detection logic (328) connected to the monitor control circuitry.

4. An interface unit according to claim 3, wherein the output module comprises data handling circuitry, a receive-transmit/instruction sequencers, a manchester encoder/decoder, and transceivers coupled to the second bus.

* * * * *